Patented Aug. 26, 1947

2,426,325

UNITED STATES PATENT OFFICE 2,426,325

INTERPOLYMERS

Pliny O. Tawney, Passaic, N. J., assignor to United States Rubber Company, New York, N. Y., a corporation of New Jersey No Drawing. Application November 19, 1943, Serial No. 510,921

3 Claims. (Cl. 260—78)

This invention relates to interpolymers, and more particularly to interpolymers of a diallyl ether, a saturated monohydric alcohol ester of an acrylic acid, and a saturated monohydric alcohol ester of an ethylenic-alpha, beta-dicarboxylic acid.

An object of the invention is to provide new compositions of matter comprising interpolymers of a diallyl ether, a saturated monohydric alcohol ester of an ethylenic-alpha, beta-dicarboxylic acid, and at least one saturated monohydric alcohol ester of an acrylic acid, and more particularly terpolymers (ternary or three-component interpolymers) of said chemicals. The invention also relates to molding powders, coating compositions, fibres, etc., containing the new interpolymerizates. Other objects will be apparent from the hereinafter detailed description.

Exemplary of the diallyl ethers are those of the formula

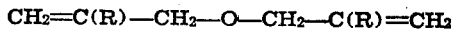

$$CH_2=C(R)-CH_2-O-CH_2-C(R)=CH_2$$

where R stands for a hydrogen atom or a methyl group.

Exemplary of the acrylic esters are those of the formula $CH_2=C(R^1)-COOR$, where $R^1$ stands for hydrogen, or a methyl or ethyl group; and R stands for a saturated alkyl group having from one to eight carbon atoms (e. g., methyl, propyl, isopropyl, butyl, isobutyl, amyl, isoamyl, isohexyl, heptyl, octyl, etc.), a cycloaliphatic group (e. g., cyclohexyl), an aryl group (e. g., phenyl), or an aralkyl group (e. g., benzyl).

Exemplary of the esters of the ethylenic-alpha, beta-dicarboxylic acids are those of the formula $ROOC-CH=CH-COOR^1$, where R and $R^1$ each stands for a saturated alkyl group having from one to eight carbon atoms (e. g., methyl, propyl, isopropyl, butyl, isobutyl, amyl, isoamyl, isohexyl, heptyl, octyl, etc.), a cycloaliphatic group (e. g., cyclohexyl), an aryl group (e. g., phenyl), or an aralkyl group (e. g., benzyl). R and $R^1$ may be identical or different, the latter case being an example of a so-called "mixed ester," and, in addition, $R^1$ may also stand for a hydrogen atom, this being an example of an acid ester, sometimes called a "half-ester."

For the polymerization I have found that either the emulsion process or the so-called oil-phase process may be employed. Since the monomers polymerize at a more nearly uniform rate in the emulsified state, the emulsion process is preferred, except in cases where an acid ester of an ethylenic-alpha, beta-dicarboxylic acid is used, and in such cases an oil-phase polymerization is found to be more expedient and is hence preferred. Various emulsifying agents, such as fatty acid soaps, isopropyl naphthalene sodium sulfonate condensation product of tetraethylene gylcol with oleyl alcohol, or Turkey red oil, may be used for the emulsion-phase polymerization.

I have found that true terpolymers result when the alkyl alkacrylate is present to the extent of from about 30% to about 70%, by weight, of the mixture of monomers. Terpolymers can also be made from mixtures, according to the invention, having at low as 17.5% of the alkacrylate. The proportion of the diallyl ether in the reaction mixture may be as low as 10% and as high as 50%. The ethylenic-alpha, beta-dicarboxylic acid ester may be present in amount of from 10% to 20% or higher, e. g., 60% of the reaction mixture. It is understood that the proportions may be varied within the indicated limits so as to modify the character of the resulting polymer.

Polymers containing high proportions of the alkyl alkacrylate and ethylenic-alpha, beta-dicarboxylic ester are tough but thermoplastic and are attacked by ketone and ester solvents. A high proportion of diallyl ether endows the polymer with a considerable degree of hardness and an increased resistance to solvents, due to increased cross-linking of the polymer chains through the diallyl ether linkages.

The products from the emulsion polymerizations are obtained as white, milky emulsions which may be used directly for various purposes, such as priming leather, for coatings, as adhesives, and for impregnation of textile and other porous materials. If so desired, suitable softening agents or fillers may be incorporated with the emulsions, before or after polymerization. Upon addition of electrolytes to the emulsion, the terpolymers are flocculated and may be recovered by filtration and drying.

These products are true terpolymers—that is, they contain the three unsaturated reactants interpolymerized—as distinguished from mere mechanical mixtures of homopolymers or binary polymers. It is impossible to separate my products into fractions by solution in and precipitation from solvents. (If the products were mechanical mixtures, such as polymethyl methacrylate with polydiallyl ether or copolymer of diethyl fumarate and methyl methacrylate mixed with polydiallyl ether, then these could be separated by preferential solution in appropriate solvents.)

Furthermore, in the case of a mechanical mixture of polymers or copolymers, a film prepared by evaporation of a solution of such mixtures on a glass plate would display some form of heterogeneity, such as opacity or cloudiness, due to the incompatibility of the various polymers. Films prepared from my products are clear and homogeneous, and hence the materials must be true terpolymers.

Moreover, my products possess appreciable iodine values, which fact indicates the presence of unsaturated groups; this unsaturation resides in the unreacted allyl groups of the bifunctional component, diallyl ether, for only one of its two unsaturated linkages is required for the formation of the terpolymer. Analyses for carbon and hydrogen on products which were carefully freed from unreacted starting materials indicate that substantial amounts of all three components are present and hence that the products are true terpolymers.

I have found that polymerization takes place slowly at ordinary room temperature and that the rate of the reaction increases as the temperature rises. I find it advantageous to operate in the range of 50° C. to 75° C., although somewhat higher temperatures may be employed in the case of oil-phase polymerization.

Polymerization catalysts of the peroxide type may be used in the preparation of my products, examples being inorganic peroxides, such as hydrogen peroxide; persalts, such as percarbonates, perborates, persulphates; and organic peroxides, such as peracetic acid, acetyl peroxide, benzoyl peroxide, benzoyl acetyl peroxide, lauryl peroxide, succinyl peroxide, etc. I have found it expedient for reasons of solubility, speed of reaction and economy, to use mixtures of potassium persulphate and hydrogen peroxide, as catalysts for the preparation of my new terpolymers.

The following examples illustrate the preparation of the new terpolymers, and it will be obvious to those skilled in the art that the proportions of reactants may be varied within reasonable limits from those actually disclosed without departing from the essence of the invention.

Example 1

A mixture of 60 parts (by weight) of methyl methacrylate, 20 parts of diethyl fumarate, and 20 parts of diallyl ether is emulsified by agitation with 200 parts of water, 4.5 parts of isopropyl naphthalene sodium sulfonate, 0.5 part of potassium persulphate, and 2.0 parts of 30% aqueous hydrogen peroxide. The emulsion is then heated at 60° C. with stirring for 20 hours, after which time solid polymer begins to precipitate from the reaction mixture. The reaction is discontinued and the emulsion coagulated by the addition of sodium chloride, yielding a finely divided white solid which is filtered, washed, and dried. This crude polymer is then carefully purified, to remove unreacted starting materials, by repeatedly dissolving it in acetone and precipitating with a medium-boiling ligroin fraction. After three such precipitations, the purified polymer is dried in vacuo to a white, fibrous, brittle solid whose weight (84 parts) corresponds to 84% of the theoretical yield.

Analysis: Found—C, 59.40, 59.60%; H, 7.91, 7.81%; iodine number (Wijs) 3.0; limiting viscosity (Ostwald viscometer) in acetone solution $(\eta/c)_0 = 0.182$.

On the basis of the above analytical results and the yield, the terpolymer contains 71% by weight of methyl methacrylate, 5.0% of diallyl ether and 24% of diethyl fumarate. The iodine number indicates the presence of unsaturation due to the presence of unreacted allyl groups of the diallyl ether incorporated in the terpolymer.

The polymer is soluble in acetone, dioxane, and chloroform. The dried polymer is a hard, transparent material which softens at 130° C. and can be drawn or extruded into fibres, or molded under heat and pressure into a variety of shapes. When suitably plasticized with plasticizers, such as dibutyl phthalate, tricresyl phosphate, ricinoleic acid esters, chlorinated diphenyl, triacetin, etc., tough elastic, rubber-like products are obtained.

The terpolymer may be rendered substantially infusible and insoluble by further polymerization in the presence of heat and/or curing agents, such as benzoyl peroxide.

Twenty parts of a 5% cyclohexanone solution of the polymer are mixed with 0.2 part of tertiary-butyl hydroperoxide and heated at 150° C. Within a few minutes the solution gels and an insoluble polymer is formed. After the polymer is separated and dried thoroughly, it is found to be almost completely insoluble in acetone and chloroform, and it does not soften at 200° C., which indicates that further polymerization had cross-linked the polymer through the residual unsaturation of the diallyl ether units in the polymer.

Example 2

A mixture of 33 parts of methyl methacrylate, 33 parts of diethyl fumarate, and 33 parts of diallyl ether is emulsified together with the catalyst as in Example 1, and the reaction is carried out at 60° C. for 25 hours. Upon being salted out, the polymer is obtained as a soft, white, plastic mass which is carefully purified as in Example 1. The pure, dry polymer is a white, brittle solid, soluble in acetone, dioxane, and chloroform, and corresponds to 62.5% of the theoretical yield.

Analysis: Found—C, 59.99, 60.07%; H, 7.81, 7.90%; iodine number (Wijs) 3.0; $(\eta/c)_0$ in acetone = 0.117.

On the basis of the yield and the analyses this product is a terpolymer containing 45.0% by weight of methyl methacrylate, 3.0% of diallyl ether and 52.0% of diethyl fumarate.

The terpolymer can be extruded or molded, or mixed with suitable plasticizers, to give tough, rubber-like products.

Example 3

A mixture of 40 parts of methyl methacrylate, 40 parts of diethyl fumarate, and 20 parts of diallyl ether is emulsified together with the catalyst as in previous examples, and the reaction is carried out at 60° C. for 23 hours. After careful purification as in Example 1, a 77% yield of product is obtained whose properties resemble those of previous examples.

Analysis: Found—C, 59.29, 59.50%; H, 7.85, 7.86%; iodine number, 4.6.

This product is a true terpolymer, containing 51.3% by weight of methyl methacrylate, 6.67% of diallyl ether and 42% of diethyl fumarate.

A sample molded at 5,000 pounds pressure and 120° C. for 15 minutes gives a clear, transparent product which is hard and tough without being brittle.

Example 4

A mixture of 70 parts of methyl methacrylate, 20 parts of diethyl fumarate, and 10 parts of diallyl ether is emulsified together with the catalyst as in previous examples, save that 1.0 part of dodecyl mercaptan is added to the emulsion as a polymerization regulator. The reaction is carried out at 60° C. for 17.5 hours, after which the solid polymer begins to deposit from the reaction mixture. The reaction is discontinued and the emulsion is coagulated by the addition of salt. The finely divided white coagulum is filtered, washed and dried, and then carefully purified by repeated precipitation from acetone with a medium ligroin fraction. After drying in vacuo, an 80% yield of white, brittle solid is obtained which is soluble in methanol, acetone, dioxane, and benzene.

Analysis: Found—C, 59.86, 59.84%; H, 8.02, 7.98%; iodine number, 2.4.

From the yield and the analyses, the product must be a terpolymer containing 66.7% by weight of methyl methacrylate, 10.0 of diallyl ether and 24.7% of diethyl fumarate.

A sample dissolved in acetone is applied as a lacquer to glass and to metal. The samples are baked at 120° C. for 30 minutes, and give hard, tough, transparent films which are found to be firmly bonded to the glass and metal surfaces.

*Example 5*

A mixture consisting of 17.2 parts (by weight) of n-butyl acid maleate, 5.0 parts of methyl methacrylate, 6.3 parts of dimethallyl ether, and 0.28 part of benzoyl peroxide is heated under reflux for one hour at the temperature of a steam bath. At the end of this period, considerable polymerization had occurred, as indicated by the very viscous nature of the reaction mixture. Upon pouring this mixture (A) into gasoline, the polymer precipitates as a white mass, which is repeatedly washed with gasoline to remove unreacted starting materials. After drying, 13 parts of solid white polymer (B) remains. It softens at 125–135° C., and is soluble in ketones, ethanol, and chloroform.

A solution of (B) in cyclohexanone is treated with a catalytic quantity of 65% tertiary-butyl hydroperoxide and thereafter heated at 150° C. Within a few minutes, gelation takes place, and an insoluble polymer is formed. Alternatively, a film of a similar solution is baked at 215° C. for twenty minutes and is thereby converted into a solvent-resistant, clear coating.

Instead of isolating (B) from (A), I may secure cast or molded articles, and coatings directly from (A). To illustrate this point, a reaction mixture (A) is treated with a small amount of tertiary-butyl hydroperoxide and heated thirty minutes at 125° C. An insoluble, infusible gel results.

*Example 6*

A mixture of 30 parts of methyl methacrylate, 20 parts of diethyl fumarate, and 50 parts of diallyl ether is emulsified and heated with stirring at 60° C. for 22 hours, after which the reaction is continued at 75° C. for an additional 5.5 hours. After the product is isolated and purified in the manner of the previous examples, a 54.5% yield of white, brittle solid is obtained which is soluble in chloroform, acetone, dioxane, glacial acetic acid, and benzene.

Analysis: Found—C, 60.90, 61.09%; H, 8.06, 8.18%; iodine number, 4.4.

As in previous examples, a consideration of the analysis and the yield indicates the existence of a true terpolymer containing 53.5% by weight of methyl methacrylate, 14.6% of diallyl ether and 31.9% of diethyl fumarate.

Having thus described my invention, what I claim and desire to protect by Letters Patent is:

1. Soluble, fusible terpolymers of (a) an unsaturated ether from the class consisting of diallyl ether and dimethallyl ether, (b) methyl methacrylate, and (c) an unsaturated dicarboxylic ester from the class consisting of diethyl fumarate and n-butyl acid maleate, said terpolymers having been prepared from mixtures of monomers in which the initial proportions by weight are from 10%–50% of the ether, from 10%–60% of the dicarboxylic ester, and from 17.5%–70% of the acrylic ester, the reaction having been stopped prior to formation of interpolymer insoluble in acetone.

2. Soluble, fusible terpolymers of diallyl ether, diethyl fumarate, and methyl methacrylate, prepared from a mixture of monomers in which the proportion by weight of the ether ranges from 10–50%, the proportion of the fumarate from 20–40%, and the proportion of the methacrylate from 17.5–70%, the reaction having been stopped prior to the formation of interpolymer insoluble in acetone.

3. Soluble, fusible terpolymers of dimethallyl ether, methyl methacrylate, and n-butyl acid maleate, prepared from a mixture of monomers in which the proportion by weight of the ether ranges from 10–50%, the proportion of the methacrylate from 17.5–70%, and the proportion of the maleate 20–60%, the reaction having been stopped prior to the formation of interpolymer insoluble in acetone.

PLINY O. TAWNEY.

REFERENCES CITED

The following references are of record in the file of this patent:

UNITED STATES PATENTS

| Number | Name | Date |
|---|---|---|
| 2,286,251 | Arnold | June 16, 1942 |
| 2,279,881 | D'Alelio (1) | Apr. 14, 1942 |
| 2,332,895 | D'Alelio (2) | Oct. 26, 1943 |
| 2,124,630 | Quattlebaum | July 26, 1938 |
| 2,047,398 | Voss | July 14, 1936 |
| 2,273,891 | Pollack et al. | Feb. 24, 1942 |

OTHER REFERENCES

Richter, "Organic Chemistry," translated by Spielmann, 2nd English edition, page 492, pub. by P. Blakiston's Son & Co., Philadelphia, Pa.